United States Patent
Guturu et al.

(10) Patent No.: US 7,289,484 B2
(45) Date of Patent: Oct. 30, 2007

(54) CALL-FAIL-SAFE METHOD FOR WIRELESS TRAFFIC DISTRIBUTION ACROSS BANDS

(75) Inventors: Parthasarathy Guturu, Richardson, TX (US); Abdennaceaur Lachtar, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1113 days.

(21) Appl. No.: 10/194,329

(22) Filed: Jul. 12, 2002

(65) Prior Publication Data
US 2004/0008643 A1 Jan. 15, 2004

(51) Int. Cl.
*H04L 12/56* (2006.01)
(52) U.S. Cl. .............. 370/343; 370/430; 370/252
(58) Field of Classification Search .......... 370/278, 370/295, 329, 342, 441, 480, 237, 252, 335, 370/430, 343; 455/404, 448, 552, 3.02, 426, 455/432.3, 450, 422.1, 429, 446, 447, 453; 380/249
See application file for complete search history.

(56) References Cited

U.S. PATENT DOCUMENTS 5,999,811 A * 12/1999 Molne .................. 455/432.3
6,035,039 A * 3/2000 Tisdale et al. ............ 380/249
2003/0125039 A1 7/2003 Lachtar et al. ............ 455/453

* cited by examiner

*Primary Examiner*—John Pezzlo
(74) *Attorney, Agent, or Firm*—Trop, Pruner & Hu, P.C.

(57) ABSTRACT

This invention presents an efficient and efficacious method for an equitable distribution of wireless traffic across the 800 and 1900 MHz bands. Even though traffic distribution across bands is desirable, there is a risk of call failure because of location of the mobile in the vicinity of a BTS group with low capacity in the other band. The method proposed here tells how decisions to migrate calls across bands can be made robust against call failures without imposing unreasonable constraints that make such decisions sparing. It presents: (i) a simple and effective quality measure for carrier-to-carrier comparison; (ii) convergence criteria flagging the convergence of the best carrier determination process for each BTS site using the afore mentioned quality measure; (iii) an effective procedure for their implementation; (iv) a decision procedure for selection of the band and carrier for call setup based on the best carriers of individual sites within the possible reach of the mobile in the two bands; and (v) an overall method that makes use of these components. It also presents method of extending this invention to next generation wireless systems that possibly operate in more than two frequency bands.

18 Claims, 4 Drawing Sheets

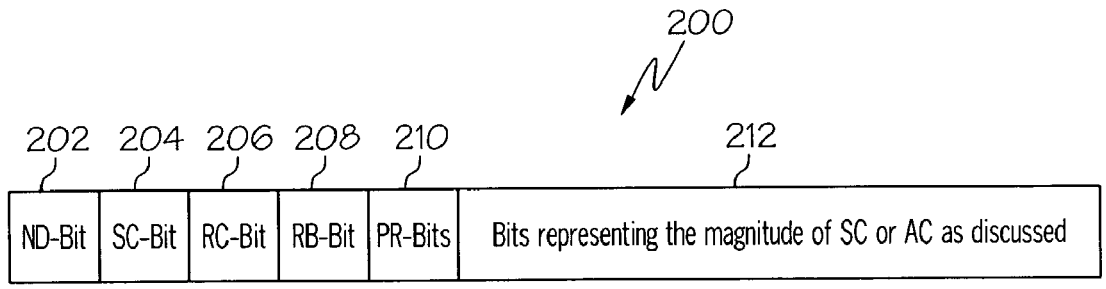

FIG. 2

| Key CellId | DATA | | | |
|---|---|---|---|---|
| ... | ... | | | |
| CID_X | BTS - X1<br>(BTS Address - X1) | BTS - X2<br>(BTS Address - X2) | | Resource List<br>(for outband Carriers) |
| | Freq - X1,1   Freq - X1,2<br>(P1)             (P2) | Freq - X2,1   Freq - X2,2<br>(P2)             (P1) | | CID_Y   CID_Z |
| ... | ... | | | |
| CID_Y | BTS - Y1<br>(BTS Address - Y1) | BTS - Y2<br>(BTS Address - Y2) | | Resource List<br>(for outband Carriers) |
| | Freq - Y1,1   Freq - Y1,2<br>(P2)             (P1) | Freq - Y2,1   Freq - Y2,2<br>(P1)             (P3) | | Not Required for the Description<br>of the method. |
| ... | ... | | | |
| CID_Z | BTS - Z1<br>(BTS Address - Z1) | BTS - Z2<br>(BTS Address - Z2) | | Resource List<br>(for outband Carriers) |
| | Freq - Z1,1   Freq - Z1,2<br>(P4)             (P2) | Freq - Z2,1   Freq - Z2,2<br>(P3)             (P1) | | Not Required for the Description<br>of the method. |
| ... | ... | | | |

FIG. 3

CALL-FAIL-SAFE METHOD FOR WIRELESS TRAFFIC DISTRIBUTION ACROSS BANDS

BACKGROUND OF THE INVENTION

1. Technical Field

The present invention is in the area of mobile wireless voice and data communications. More particularly, it is related to the field of mobile cellular and personal voice and data communications using Code Division Multiple Access (CDMA) techniques.

2. Description of the Related Art

Of late, there is an increasing demand for wireless services. In order to meet this demand in a cost-effective way and at the same time provide a good quality of service for customers, particularly in terms of the call success rate, service providers need to implement effective load distribution mechanisms with pooled resources. As the first step to meeting this goal, many wireless Code Division Multiple Access (CDMA) service providers maintain a pool of carriers (frequencies) spread over multiple co-located (1-1 overlay system of) Base-station Transceiver Subsystems (BTSes) at each cell site and distribute calls originated at any carrier in the system to any other member of the system using some pre-configured call distribution criteria. The criteria are compound functions of carrier capacities (i.e. number of calls they can support based on the available resources) at any time, their thresholds and priorities determining different types of carrier loading such as even, sequential priority, etc., and some customer preferences for the originating carrier and/or band, and so on. Earlier invention, entitled "Multi-Carrier Traffic Allocation Enhancements to reduce access failures and work across bands," U.S. patent application Publication Ser. No. 2003/0125039, by one of the co-inventors (Abdennaceaur Lachtar) of the present invention, proposes some effective criteria for load distribution of traffic among carriers in either or both the 800 and 1900 MHZ bands. The current invention enhances that solution with a quality measure for simple and effective implementation of the carrier-to-carrier comparison using any or all of the four load distribution criteria proposed therein. It also contributes to the efficiency of the solution by providing some simple and effective convergence criteria that permit early decision making without affecting the end result and an efficient procedure for implementing them.

When a mobile operates in a single band, effective load distribution with a decent call success rate is achieved by setting the call upon the best carrier (as per this quality measure) in that band. However, the problem becomes complicated because calls originating on dual-band mobiles are required to be equitably distributed across bands, that is, between the 800 and 1900 MHz bands, for better load-balancing. This is particularly important because the 1-1 overlay systems in the two bands may not be identically located due to independent cell planning for the two bands based on their respective radio transmission characteristics. Further, the coverage area of an 800 MHz BTS is roughly 3 times that of a 1900 MHz BTS. Thus it is, in general, possible that a mobile in the range of an 1-1 overlay system in one band, could only be covered, irrespective of its position in that range, by multiple spatially disjoint 1-1 overlay systems (also called a non 1-1 overlay system) in the other band. Criticizing a still earlier proposal to solve this problem using temporary channel assignments followed by multi-pilot hard handoffs on grounds of high access rate failures, earlier invention "Multi-Carrier Traffic Allocation Enhancements to reduce access failures and work across bands" by one of the co-inventors (Abdennaceaur Lachtar) of the present invention, proposes a method of redirecting the call to the other band in situations where there is no capacity on any carrier in the band of call origination. However, the load distribution across bands is not effective in this latter method because of the conservative approach to redirect calls to another band only when there is no capacity in the band of call origination.

There is a need for an efficient and efficacious method that distributes wireless traffic equitably across multiple bands without compromising robustness against call failures. Even though traffic distribution across bands is desirable, there is a risk of call failure because of location of the mobile in the vicinity of a BTS group with low capacity in the other band, prompting a need for a call-fail-safe method that is not unreasonably constrained to make decisions to migrate calls across bands.

SUMMARY OF THE INVENTION

This invention provides an efficient and efficacious method for an equitable distribution of CDMA wireless traffic among carriers (frequencies) belonging to both 800 and 1900 MHZ bands. This method ensures robustness against call failures during migration of calls from one band to the other, without being unduly restrictive in distributing calls across bands.

The first part of the invention constitutes a novel quality measure for choosing the best carrier (frequency) for call set-up by comparison of carriers using the capacity information of the individual carriers and pre-configured load-balancing criteria (including preferences for some types of carriers, e.g. carriers of the same band as the carrier of call origination for a particular call).

The second part of the invention is the procedure for selection of a representative carrier from the pool of carriers belonging to the other band for the purpose of making a decision on whether to redirect the call to the other band, by comparing the representative carrier with the best carrier in the band of call origination. Using the key idea that, corresponding to a 1-1 overlay system of co-located Base-station Transceiver Subsystems (BTSes) in a band, there will, in general, be a non-1-1 overlay system of BTSes (that is, multiple spatially disjoint 1-1 overlay systems), in the non-originating band for guaranteed coverage of the mobile's position, this procedure first segregates all the non-originating band carriers associated with different BTSes into buckets corresponding to their respective BTS sites. Next, the best carrier of each bucket as per the above quality measure is found and then the worst of these best carriers from individual buckets is selected as the representative of the non-originating band carriers for comparison with the best originating band carrier, provided the latter has capacity. Choice of the worst carrier of the non-co-located buckets ensures safeness in the cross-band decision as the mobile could be in the vicinity of the worst site (bucket). Moreover, choice of the best carrier from each bucket ensures that cross-band decisions are not overly restricted.

Additionally, in situations where no carrier in the band of call origination has capacity, but, at least one carrier of the non-originating band has capacity, this invention proposes to improve the likelihood of a call succeeding by redirecting the call to the non-originating band.

This invention also presents an effective implementation of some convergence criteria that permits an early decision-making without affecting the end result and thereby makes the overall process efficient.

Finally, this invention presents an extension of the above method of selecting a representative carrier from a non-originating band to future wireless systems operating in more than two bands. In that situation, there will be multiple non-originating bands and there will be a non-1-1 overlay system corresponding to each non-originating band. The same worst-of-the-best carrier determination procedure of finding the representative carrier is applied for each non-originating band. The best non-originating band for call redirection is decided as the band containing the best one among these representative carriers and call is redirected to the said band if and only if this best representative carrier happens to be better than the best carrier in the band of call origination. In the situation where neither the best carrier in the band origination nor any of the non-originating band representatives as determined above has capacity, a slightly different procedure is adopted. According to this procedure, the best carrier among all sites of each particular non-originating band sites is considered as the representative of the respective band. As before, the best band for call redirection is decided as the one with the best one among these representatives and the call is migrated to that band if this best representative has capacity; otherwise, call is failed.

BRIEF DESCRIPTION OF THE DRAWINGS

The novel features characterizing this invention are set forth in the appended claims. The invention itself, however, as well as the preferred modes of use, further objects and advantages thereof, will best be understood by reference to the following detailed description of an illustrative embodiment when read in conjunction with the accompanying drawings, wherein:

FIG. 2 is a schematic diagram of a possible bit pattern used for setting up the carrier quality measure incorporating different carrier selection criteria on a computer word;

FIG. 3 is a table illustrating information about different co-located BTSes and their associated carriers in different 1-1 overlay systems.

DETAILED DESCRIPTION OF AN ILLUSTRATIVE EMBODIMENT

Figure 1:
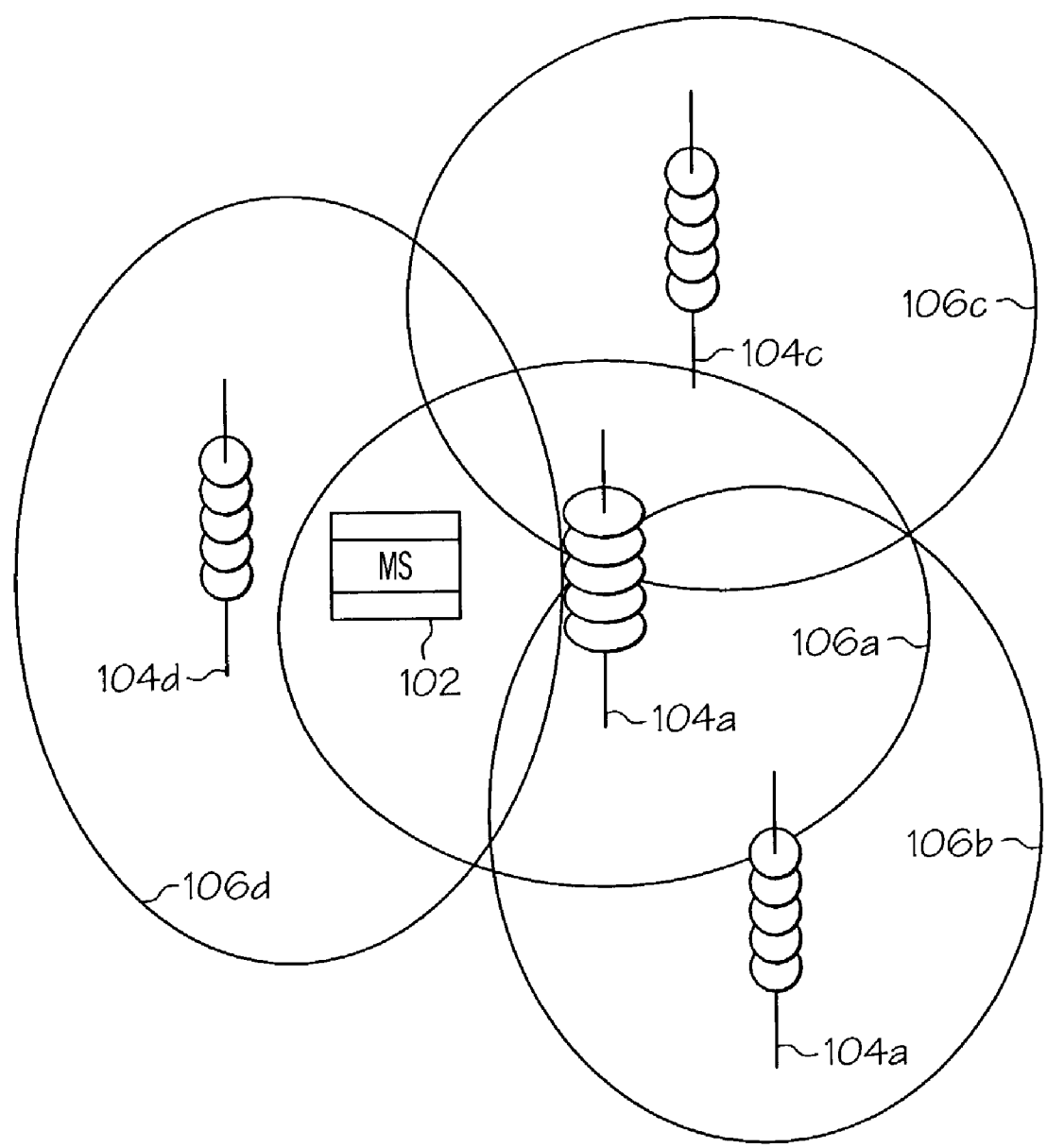
FIG. 1 is a schematic illustrating the concept that spatially disjoint multiple 1-1 overlay systems of co-located base-station trans-receivers in another band may be required for covering the position of a mobile in the range of an 1-1 overlay system in a particular band.

Referring now to the drawing figures, in which like numerals indicate like elements or steps throughout the several views, the preferred embodiment of the present invention will be described. In general, the present invention provides for equitable wireless traffic distribution across multiple bands with robustness against call failures.

With reference now to FIG. 1, a typical situation where a mobile capable of operating in both the 800 and 1900 MHZ bands originates a call in one of the bands (originating band) is illustrated. A number of 1-1 overlay systems 104*a–d* each comprised of a group of co-located Base-station Transceiver Subsystems (BTSes) and their respective coverage areas 106*a–d* are depicted. The BTS group (1-1 overlay system) 104*a* operates in the 800 MHz band while the BTS groups 104*b–d* operate in the 1900 MHZ band. Mobile 102 is in the range 106*a* of 1-1 overlay system 104*a*. Each BTS in the system 104*a* uses one or more carriers (frequencies) in the 800 MHz band and hence the mobile can tune to one of those carriers and initiate call set up. In case it is required to redirect this call to the other (1900 MHz) band, it may not be possible to find a unique 1-1 overlay system of 1900 MHz BTSes with radio coverage that includes the mobile's 102 arbitrary location in the range 106*a* of the original overlay system 104*a* for a number of reasons: (i) Due to independent cell planning based on the differences in radio transmission characteristics in the two bands, the overlay systems in the two bands will not be located at the same place; and (ii) Even if the overlay systems were located at the same place, their coverage would not be the same. Study of radio transmission characteristics in the two bands indicates that the coverage area of an 800 MHz BTS is 3 times that of a 1900 MHz BTS. Thus, for call redirections from 1900 MHz band to 800 MHz band, it may be possible to find a unique 800 MHz 1-1 overlay system covering the range of the 1900 MHz 1-1 overlay system on which a call could be initiated. However, for the call redirections the other way (800 MHz to 1900 MHz) as in case of the present example, at least 3 1-1 overlay systems of the non-originating band are required to cover the mobile's position in the range of the 800 MHz 1-1 overlay system on which the call is initiated originally. In brief, it can be said that corresponding to a 1-1 overlay system in one band, there will, in general, be a plurality of spatially disjoint 1-1 overlay systems of the other band whose combined radio coverage will include the domain of the 1-1 overlay system of the original band. In FIG. 1, the ranges 106*b–d* of the overlay systems 104*b–d* of the non-originating band together cover the range 106*a* of the overlay system 104*a* operating in the band of call origination. Thus, when a call is required to be established in the band of origination, it is enough to consider the carriers of system 104*a*. However, when a call is required to be redirected to the non-originating band, all the carriers of the systems 104*b–d* need to be considered. How to consider those carriers in the latter (call redirection) case in view of the different locations of their usage and unpredictability of mobile's 102 position (in the combined range 106*b–d* of systems 104*b–d*) is the main problem addressed in this invention.

There are two possible general situations for call setup. In one situation, a call is required to be established on one of the carriers of the originating band only (in this example, the carriers of system 104*a*) for various reasons such as customer preference or capability of mobile 102 to operate in a single band. In a second situation, where a call could be set up on a carrier of either band, it is useful to determine the better of the two overlay systems—originating band one (104*a* in this example) and the non-originating band one in the vicinity (104*d* in this example) of the mobile—by comparing their respective best carriers. In either case, effective load balancing is achieved by establishing a call on the best carrier of the corresponding system (104*a* in the first situation and better carrier of 104*a* and 104*d* in the second situation).

Identification of criteria to be used for comparison of carriers in the process of determination of the best carrier is the fundamental problem that arises in this context. Earlier invention, entitled "Multi-Carrier Traffic Allocation Enhancements to Reduce Access Failures and Work Across Bands" by one of the co-inventors (Abdennaceaur Lachtar) of the present invention, proposes four effective load distribution criteria that include carrier capacities and pre-configured customer preferences. The following discussion illustrates a method for constructing a quality measure incorporating any or all of these criteria for the purpose of ordering the carriers (particularly, determining the best or worst carriers) by carrier-to-carrier comparison in a simple and effective way. Further, convergence criteria that indicate a search for the best carrier may be terminated because the consideration of the remaining carriers will not affect the result are also presented Referring now to FIG. 2, one possible method for comparison of two carriers by constructing a quality measure for each carrier by manipulating the bit pattern of a computer data word is depicted. Different characteristics of a carrier such as its capability to support 2G or 3G Voice call, its capacity (available radio resources), some customer specified constraints etc., determine the optimality of a carrier for setting up a particular type of call. These characteristics may be ordered based on their importance and carrier-to-carrier comparison may be completed in a number of ways.

One approach to determine the better (or worse) of two carriers is to compare the carriers on the basis of the characteristics of higher importance first and continue comparison of characteristics of lower importance only in case of a tie, until all ties are resolved. For example, in the case of a 3G Voice call, a carrier may be defined to be either non-downgraded or downgraded depending upon whether it has 3G radio resources available. Thus, in case that there are two carriers, one downgraded and the other not, the latter is chosen. Only when both carriers are either downgraded or non-downgraded, the next selection criterion is considered for examination.

A second approach, which is simple and effective, is to design an overall optimality measure as a data word (depicted as data word 200) in which the more significant bits are determined by the more important characteristics of the carrier. Considering the above example once again, the downgraded status bit becomes the most significant bit.

In order to design the overall optimality measure, it is first required to determine its constituent individual quality measures of a carrier as well as the user-specified constraints. The individual quality measures that are considered are listed in Table 1.

TABLE 1

The individual quality measures constituting the overall quality-measure of carrier. This information changes with the calls set up on a carrier and is obtained from the corresponding BTS.

| Name | Description |
| --- | --- |
| ND | Non-downgraded status. A carrier is defined to be downgraded if the mobile has requested for a 3G (third generation) Voice Call, which is of higher quality than a 2G Voice call, but, the carrier has only resources for a 2G call. Alternatively, a non-downgraded carrier is one that has the resources to support the requested call type. Obviously, a carrier that does not compromise the quality of the call will be preferred over the other that does. |
| AC | Available Capacity (AC) is the capacity available in terms of new calls that can be set up on a carrier of a BTS at any time after a number of calls have been set up. This measure is computed dynamically by the BTS by taking into consideration the hardware resources available to set up calls of the type (2G-Voice/3-G-Voice/3G-Data) of the currently requested call in addition to the on-going calls consuming these resources on that carrier. This measure will form a part of overall quality measure only if there is no spare capacity (as defined in the following row) on the BTS. |

TABLE 1-continued

The individual quality measures constituting the overall quality-measure of carrier. This information changes with the calls set up on a carrier and is obtained from the corresponding BTS.

| Name | Description |
| --- | --- |
| SC | Spare capacity (SC) is the available capacity on a BTS to house a number of calls over and above a pre-specified threshold. Mathematically, SC = AC − THRESHOLD (obviously, only positive value of SC implies availability of spare capacity). This quantity THRESHOLD is pre-determined and provided by the customer (service provider) at configuration time. This quantity is determined based upon the hardware resources the customer likes to reserve for calls that arise because of soft handoffs, that is, movement of a mobile from another sector to the current sector in cell (BTS coverage area). It may be noted here that some BTSes called metro-cells have their coverage areas divided into a number of sectors (usually 3) and use different antennas operating in different orientations at different frequencies to service the individual sectors. Soft-handoff call setup requests, being requests to continue the existing calls in a seamless manner without disruption or change in quality, from slightly different mobile positions, need to be given higher priority compared to brand new call setup requests and hence the need for this reserve (THRESHOLD) capacity. |

The constraints that a user or a service provider may specify on a per carrier basis are listed in Table 2. For sake of simplicity, the band of call origination will be, in the sequel, referred to as inband and the other (non-origination) band, as outband.

TABLE 2

User specified constraints for call distribution

| Name | Description |
| --- | --- |
| RC | Retain Carrier constraint enforces retaining of the call on the access carrier (i.e. carrier of call origination) if No other carrier has better downgraded status than the access carrier and the latter has spare capacity. In other words, the current situation is not one in which the access carrier is downgraded and some other carrier is non-downgraded. Access carrier has spare capacity, that is, its SC > 0. |
| RB | Retain Band constraint enforces retaining of the call on the inband best carrier if The outband representative carrier (chosen as per the method discussed in the summary) has no downgraded status than the inband best carrier, that is, the condition of the inband best carrier being downgraded and the outband representative being non-downgraded has not occurred in the current call setup scenario. The inband best carrier has spare capacity, that is, its SC > 0. |

These two constraints specified by the service-provider on a per carrier basis should be available with other configuration information associated with originating carrier. They may be applied independently, but, in case both of them are specified, RC takes precedence.

Now, the individual bits of the overall quality measure shown in FIG. 2 are set as follows:

TABLE 3

Description of different bits used in the quality measure

| Bit | Description |
|---|---|
| ND-Bit 202 | Set to 1 if carrier is non-downgraded and to 0, otherwise. |
| SC-Bit 204 | Set to 1 if SC (= AC − threshold) > 0 and to 0, otherwise |
| RC-Bit 206 | Default to 0, but set to 1, if all the following conditions are true: a) User specifies RC constraint b) Carrier under consideration is the access (originating) carrier c) For this carrier SC > 0, that is, SC-bit is ON. |
| RB-Bit 208 | Default to 0, but set to 1, if all the following conditions are true: a) User specifies RB constraint b) Carrier under consideration is an inband carrier c) For this carrier SC > 0, i.e. SC-bit is ON. |
| RB-Bit 208 | Default to 0, but set to 1, if all the following conditions are true: a) User specifies RN constraint b) Carrier under consideration is an inband carrier c) For this carrier SC > 0, i.e. SC-bit is ON. |
| PR-Bits 210 | These bits encode the level of preference for loading this carrier. In case all other higher priority bits are the same for two carriers, a carrier with higher preference between the two carriers is chosen. These bits can be set to zero (the lowest possible value) in case the SC-bit for the current carrier has been set to OFF and it is required to enforce the condition that carriers with no spare capacity are treated on an equal footing. |
| Magnitude Bits 212 | These bits define the magnitude of SC if SC > 0 and magnitude of AC, otherwise. |

All bits (and hence the overall quality measure) may be set to zero if AC=0. This will give the lowest possible quality measure to all carriers with no available capacity.

Given the above definition of the carrier quality measure, the following list of rules is employed in an exemplary embodiment to determine priority:

Choose a carrier with AC>0 over another with AC=0
  Among carriers with AC>0, choose a non-downgraded one over a downgraded one
  Among two carriers both downgraded or non-downgraded, choose one with SC>0 over the other with SC<=0.
  Give preference to access carrier over another carrier of equal downgraded status if user specifies RC-constraint and access carrier has spare capacity.
  Give preference to an inband carrier over an outband carrier of equal downgraded status if user specifies RB-constraint and the inband carrier has spare capacity. Note that this preference gains importance only if the aforementioned preference due to RC-constraint cannot be applied because either the user did not specify RC-constraint or the access carrier did not have spare capacity.
  In case two carriers are identical in the earlier discussed measures, but differ in preference level, the carrier with higher preference among the two is chosen.
  In case of carriers which are identical in the previous aspects, choose a carrier on the magnitude of SC or AC, depending upon whether both the carriers have SC>0 or SC<=0. The case where one carrier has SC>0, and the other does not, is not an issue at this point.

The above quality measure may also be extended, if the customer so desires, to give preference to access carrier over any other carrier and an inband carrier over an outband carrier in a situation in which none of the two carriers have spare capacity and both have equal AC by augmenting the above quality measure with two more bits—an access (originating) carrier bit (OC-bit, not depicted) and originating band bit (OB-bit, not depicted), respectively, as its two least significant bits (with lesser significance than all the depicted bits).

Considering again the situation illustrated in FIG. 1, it is not logically correct to put the inband (carriers within the originating band) carriers on an equal footing with the outband (carriers within the non-originating band) carriers. If the best carrier in terms of capacity in the non-originating band is taken as the basis for call transfer across the band, there is a likelihood that call may fail because mobile 102 may be exclusively in the range of a co-located system of outband BTSes with fully loaded (that is, zero-capacity) carriers. In the example above, the best carrier (assuming it belongs to the outband BTS system 104b) may be far better than the inband best carrier (the best carrier of BTS system 104a). However, mobile 102 will only be able to communicate with the system 104d in the non-originating band because of its position. If the best carrier of the system 104d has no capacity, the call will eventually fail after re-origination in the non-originating band based on the misleading information regarding the overall best carrier in the non-originating band.

To reduce the likelihood of the above situation, the present invention ensures call-safeness (or robustness against call failures) with an equitable (rather than equal) load-distribution by making cross-band decision (decision to migrate a call to the other band) only if the worst of the best carriers from different outband BTS systems is better than the inband best carrier. The rationale behind this approach is that if the mobile is in the vicinity of an outband BTS system, it may be allocated its best carrier, but, it could be, at the time of the call, in the range of only the worst BTS system (that is, the system whose best carrier is the worst among the best carriers of the different outband BTS systems). Thus, since a representative from the best carriers of different outband 1-1 overlay systems is considered for a comparison with the inband best carrier, the cross-band decisions will not be overly restricted in the current approach. At the same time, robustness against call failures is ensured by taking the cross-band decision only when the carrier on which the call may be housed in the non-originating band in the worst case scenario is better than the inband best carrier with due consideration to all carrier-to-carrier comparison criteria mentioned above. This procedure for selecting the worst one among the best carriers as outband representative carrier may be viewed as the process of finding the carrier with minimal quality measure among maximal quality measure carriers from different outband BTS sites. Hence, this procedure will be termed as the min-max procedure.

In an exceptional situation where neither the inband best carrier nor the outband representative carrier (chosen as above using the min-max procedure) has capacity, the present invention provides an additional safeguard against call failure. In this situation, a call is bound to fail if it is set up on a zero-capacity inband carrier. It is also not fair to fail the call right away on the basis of the information about the capacity of the outband representative. Unless all outband carriers are of zero-capacity, there is a likelihood of the call success in that band if the mobile is in the vicinity of an outband BTS system with some capacity. Thus, there is no need to consider the worst case outband scenario when the inband carriers are known to be any way unfavorable for call success. Hence, in order to prevent this kind of call failure, the present invention proposes to direct the call from zero-capacity originating band to the non-originating band provided that at least one carrier in the non-originating band has capacity. In one embodiment of the invention, this condition is determined by checking if the best carrier among the carriers of all outband sites (the best-of-the-best or max-max carrier) has nonzero capacity. In another embodiment of this invention, this condition is determined by examining whether any outband carrier would be left out for performing the min-max procedure after eliminating zero-capacity outband carriers. Determination of this condition in either way helps the redirection of a call from a band without capacity to the non-originating band even if one or more outband BTS groups have no capacity or are brought down because of either failures or wilting (that is, maintenance purposes). Call redirection to the non-originating band under this condition improves call success rate because of the possibility of the mobile being favorably located in the vicinity of an outband BTS group with capacity.

With reference now to FIG. 3, a means for storing the data corresponding to different 1-1 overlay systems and their associated BTSes and supported carriers in a tabular form in an in-memory database at the base-station controller (BSC) subsystem for easy access and convenient application of the cross-band traffic distribution method proposed in this invention is illustrated. When a call is made from/to a mobile employing CDMA (Code Division Multiple Access) technology, the call first originates on a frequency (also called a carrier) supported by a BTS in the range of the mobile. The total service area of the mobile is partitioned, based on the locations of a service provider's BTSes, into geographical areas called cells (and hence depicted in the wireless literature by hexagonal shapes resembling the cells of a living tissue). Each cell is given a unique number for the purpose of identification with other cells. A cell, depending upon its size, may be divided into a number of sectors with each sector serviced by a radio antenna (with a particular orientation) of a BTS. The sectors are identified by the sector numbers. A number of carriers of a particular CDMA frequency of a band type may be used in a sector. Thus a carrier (frequency) is uniquely identified and distinguished from others by means of four parameters, namely, cell number, sector number, band class and CDMA frequency. The BTSes covering the same sector as that of the BTS supporting the frequency of call origination (the so-called originating frequency or access frequency) all share the same cell and sector numbers. The cell and sector number tuple may be termed as CellId for the sake of simplicity and a CellId may thus be used as an identifier for a particular site of co-located BTSes.

Now it is convenient to organize the user (Service Provider)-configurable information regarding different frequencies as a table 300 whose entries (rows) can be indexed by the CellIds (as depicted under CellId Column 302). A Data column 304 of each row contains information regarding different BTSes associated with a particular CellId organized as separate sub-columns for each individual BTS. Additionally, Data column 304 may contain another sub-column termed as resource list for storing the list of CellIds (here, CID-Y and CID_Z) corresponding to outband BTS groups required to cover fully the area of the inband BTS group. This list is useful for accessing, from the table, the information required for applying the cross-band traffic distribution method proposed here in situations where the facility to distribute calls across bands is enabled.

During call setup, the information regarding BTSes co-located with the BTS of call origination (and hence in the same CellId row) is used. Each sub-column containing the information regarding a particular BTS in BTS group with a CellId such as CID_X here, in turn, contains the communication address of the BTS and a number of next level sub-columns one each for the user-configured static information of an individual carrier (frequency) used by the BTS for communication with a mobile in its range. This static information includes priorities or preferences for load distribution (represented by the letters P1 and P2 in table 300), thresholds (capacities reserved for soft-handoff), user-specific requirements such as RB/RC constraints mentioned earlier, multi-mode traffic allocation (that is, cross-band traffic distribution), etc., of the individual carriers. As described in Table 1, a soft-hand-off call is an on-going call that needs to be migrated to a BTS serving the current sector because of the movement of the mobile (user) into the range of this sector from another sector. Service providers may set this threshold to a higher value depending upon the need to ensure the success of these soft-hand-off calls vis-à-vis new calls.

The Multimode Traffic Allocation (MMTA) method described below utilizes the dynamic information about the capacities of different carriers (obtained by solicitation from the corresponding BTSes) in conjunction with the aforementioned static information derived from the CellId table 300 to determine if a call should be redirected to another band or be set up on a carrier in the originating band. This method for equitable traffic distribution across bands may now be described as follows:

Each CellId in a resource list, in turn, has an entry in the CellId table. For example, since CellId CID_X includes CellIds CID_Y and CID_Z in its resource list, there are rows corresponding to CID_Y and CID_Z also in CellId table 300. Referring back to FIG. 1, the BTSes in each one of the outband CellId groups (104b-d) are co-located among themselves, though the BTSes from different CellIds are not co-located. The set of BTSes with at least one representative from each one of these outband CellIds is expected to cover, in the non-originating band, the position of the mobile irrespective of its location in the range of the BTS of call origination. In table 300 also, just as in the example of FIG. 1, the BTSes in the row CID_Y are co-located among themselves and so is the case with the BTSes in the row CID_Z. However, since CID_Y and CID_Z designate two different sites, a BTS from one group is not geographically co-located with any BTS of the other group. By including the CID_Y and CID_Z in the resource list of CID_X, the service provider supplies to the BSC software the information that any BTS in row CID_Y and another one in row CID_Z together cover the mobile in the non-originating band irrespective of where it is currently located in the range of the 1-1 overlay system (of the originating band) represented by CID_X.

Using the addresses of the individual BTSes available in the row CID_X of the CellID table, the BSC sends requests to those BTSes for information regarding the available capacities (ACs) and downgraded statuses of their respective carriers. Further, in case the mobile has capability to operate in the two bands and the originating frequency has been configured for MMTA (that is, cross-band distribution requirement), similar requests are sent to BTSes in each one of the rows corresponding to the CellIds (CID_Y and CID_Z, here) in the resource list of the originating CellId (CID_X, here). Using the capacity and downgraded information of the carriers provided by the BTSes in conjunction with the static information available for those carriers in the CellId table, the quality measures for those carriers are obtained using the earlier described procedure. In case a BTS does not respond within a pre-configured time limit, the quality measures of its carriers are set to zero. As a first step in decision-making, the best carrier in each one of the rows CID_X, CID_Y and CID_Z is determined by comparing the quality measures of the frequencies in each group separately. Now, final decision-making is done as per the earlier discussed method of this invention depending upon the following conditions:

If the inband best carrier from the CellId group CID_X has nonzero capacity estimate, Compare that carrier with the min-max carrier, that is, worst carrier among the best carriers of the CellId groups CID_Y and CID_Z. Now, If the inband best carrier is better, set the call upon that carrier Otherwise, redirect the call to the other band. Since even the worst out CellId group is better than the inband CellId (represented by its carrier), better load distribution with guaranteed call success is achieved.

Otherwise, that is, the inband best carrier (and hence all inband carriers) have CE equal to 0, Redirect the call to the other band, if any carrier from the CellId groups CID_Y and CID_Z has capacity. This outband capacity checking may be done using either of the two possible methods: i) Check whether the best one among the bests of different outband CellId groups (only CID_Y and CID_Z, here) has non-zero CE. ii) Eliminate all outband CellIds whose best carriers have zero CE and verify whether any outband CellId will be left out.

Fail the call if no outband carrier has capacity.

When a decision to redirect a call to the other band is taken as per the above procedure, the Base-station Subsystem (BSC) conveys to a mobile through Mobile Switching Center (MSC) the information required to re-originate the call in the other band. MSC constantly keeps track of mobiles and hence convey to the mobile the relevant information by paging it through a BTS within the mobile's reach. The information required to be conveyed in this context is the best outband capacity carrier (among those with a paging channel) and list of pseudo-noise codes (that is, codes used for encoding/decoding messages) associated with the different outband sectors so that the mobile can tune to the carrier in the non-originating band and reinitiate the call set-up process. Following this re-initiation, the carrier determination process starts in the non-originating band (which now becomes the originating band), but this time, MMTA option with possible redirection of the call non-originating band is prohibited on this re-originated (or re-initiated) call in order to avoid the ping-pong effect or the effect of call switching between bands when the two bands are almost equally loaded. Consequently, the re-originated call is either established on the other band or the call is failed in case the resources get exhausted by other calls within the time window of the call redirection. The process described above is transparent to a user and hence allows seamless migration of the call to the other band. Call-safeness is ensured by a careful, yet non-conservative approach to cross-band decision making as suggested earlier.

The method described above may be illustrated with some typical example problem tabulated in Table 4 below based on the configuration shown in FIG. 3.

TABLE 4

| CARRIER | PRE-FERENCE | AC | THRESHOLD | SC | NON-DOWNGRADED? |
|---------|-------------|-----|-----------|-----|-----------------|
| Freq.X1,1 | P1 | 30 | 0 | 30 | No |
| Freq.X1,2 | P2 | 50 | 50 | 0 | Yes |
| Freq.X2,1 | P3 | 20 | 0 | 20 | Yes |
| Freq.X2,2 | P4 | 25 | 0 | 25 | Yes |
| Freq.Y1,1 | P1 | 10 | 15 | −5 | Yes |
| Freq.Y1,2 | P2 | 10 | 0 | 10 | No |
| Freq.Y2,1 | P2 | 10 | 0 | 10 | Yes |
| Freq.Y2,2 | P3 | 30 | 0 | 30 | Yes |
| Freq.Z1,1 | P1 | 50 | 0 | 50 | No |
| Freq.Z1,2 | P1 | 20 | 25 | −5 | Yes |
| Freq.Z2,1 | P1 | 0 | 0 | 0 | Yes |
| Freq.Z2,2 | P1 | 5 | 0 | 5 | Yes |

EXAMPLE 1

Given:
Originating Carrier=Freq. X1,1
Algorithm data filled for this carrier does not specify either retain carrier (RC) or retain band (RB) constraints.
Preferences P1>P2>P3>P4
AC information obtained from the BTSes, data-filled preference information and the computed SC information are shown in Table 4.
Result: Among the inband carriers Freq.X1,1, Freq.X2,1, Freq.X2,1 and Freq.F2,2, Freq.X1,1 goes out of reckoning because it is downgraded. Freq.X2,1 is not considered because of non-availability of spare capacity. Finally, between the remaining two carriers, Freq.X2,2 loses despite higher spare capacity because of lower preference value and Freq.X2,1 becomes the best inband carrier. Using the same logic, it can be established that Freq.Y2,1 and Freq.Z2,2 are the best carriers of the outband CellId groups CID_Y and CID_Z, respectively. Among these again, Freq. Y2,1 will be the loser because of lower preference value (despite higher spare capacity). Thus, as per the min-max criterion proposed here, Freq. Y2,1 will be the outband representative. This carrier, when compared with the inband best carrier Freq.X2,1, wins because of higher preference value. Hence, a decision to migrate the call to the other band is taken by base station controller and a request is made to the mobile to re-originate the call in the other band.

EXAMPLE 2

Given: Same as in the above example, excepting that RC and RB constraints are specified by the algorithm.
Result: It may be assessed from the above criterion function that, despite the RC constraint, the call cannot be retained on the downgraded carrier Freq. X1, 1. However, the best inband carrier Freq. X2,1 will win over the outband representative by virtue of the preference given by the RB constraint.

EXAMPLE 3

Given: Same as example 2 excepting that the originating carrier is Freq. X2,2.
Result: Here the RC constraint overrides RB constraint (because it defines the higher order bit in the criterion function) and hence the inband carrier selected will be Freq. X2,2.

EXAMPLE 4

Given: All thresholds are set to be higher than the AC values in the corresponding rows.

Result: Here, the selected carrier will be the carrier Freq. X1,2, which is the non-downgraded carrier with the highest AC value among the inband best carrier and the outband min-max representative. Priorities, RC and RB constraints do not matter here unless these two carriers have the same AC value.

EXAMPLE 5

Given: The AC values for the frequencies in first 4 rows set to zero. Thresholds, RC and RB values do not matter since they do not affect the final decision.

Result: Since at least one outband carrier has capacity, decision to redirect the call to the other band is taken.

EXAMPLE 6

Given: The AC values for the frequencies in all the rows set to zero. Thresholds, RC and RB values do not matter since they do not affect the final decision.

Result: Since no inband or outband carrier has capacity, call is failed.

In order to more efficiently determine the best carrier, a convergence (or stopping criteria) for termination of the best carrier selection process is employed in a preferred embodiment. As previously described, the present invention works with one 1-1 overlay system in the band of call origination and zero (if cross-banding is not permitted) or more 1-1 overlay systems in the non-originating band. Thus it is required to work with independent processes of best carrier determination in each 1-1 overlay system. In one embodiment of the invention, at the start of the process, requests are sent to the BTSes in each overlay system to respond with the information about the capacities and downgraded statuses of their respective carriers. As responses arrive from those BTSes, depending upon which CellId group (1-1 overlay system) they belong, the corresponding best carriers are updated utilizing the quality measure previously discussed. The process may be terminated when it is possible to infer that all the information to take a decision to either stay inband or redirect the call to the other band has been obtained from the BTS responses and future responses will not influence the decision. This termination condition is termed as global convergence here.

In a preferred embodiment, the global convergence is identified by computation of a boolean flag (GLOBAL_CONVERGENCE) as follows:

GLOBAL_CONVERGENCE=RC CRITERION or RB_CRITERION or LOCAL_CONVERGENCE for all CellId groups RC_CRITERION is a flag that determines whether an optimal carrier as per the earlier defined retain carrier (RC) constraint has been determined. RC_CRITERION is set to true if the current inband best carrier has both the ND and RC bits ON. The RC bit is set ON only if the customer chooses RC-constraint and the originating carrier has spare capacity.

RB_CRITERION is a flag that similarly determines whether an optimal carrier as per the earlier defined retain band (RB) constraint has been determined. RB_CRITERION is set to true if LOCAL_CONVERGENCE flag (i.e. Boolean indicating convergence of the best carrier determination process) for the inband CellId group is already set true and the current inband best carrier has both ND and RB bits ON. The RB bit is set ON only if the customer chooses RB-constraint and the current inband best carrier has spare capacity.

Local convergence of the best carrier determination process for a CellId group is the identification of condition that the best carrier of that CellId group has already been obtained from the received BTS responses and pending responses from the remaining BTSes of that group, if later obtained, will in no way affect the result. As a part of the global convergence determination process, it is required, as per the above equation, to establish separately the local convergence for each CellId group. In a preferred embodiment, a boolean array LOCAL_CONVERGENCE is utilized to indicate the convergence statuses of the best carrier determination processes for different CellId groups. Initially, the values in the array are set to true and are marked to false only when the capacity requests are sent to the first BTS in that group. This ensures that unnecessary waiting for convergence of the best carrier selection process based on capacity responses that do not arrive (because no requests are sent) is avoided. The convergence status of the best carrier selection for an individual CellId group, say CellID_X, may be computed as follows:

LOCAL_CONVERGENCE [CellID_X]=(RC_CRITERION is true and this CellID_X is the inband CellId) or All_BTSes_of_this_CellID-X_group_responded or CURRENT_BEST_OPTIMALITY_CRITERION [CellID_X].

where,

CURRENT_BEST OPTIMALITY_CRITERION [CellID_X].=All carriers of this CellId group with priority equal to or higher than the current best are considered and current best has ND and SC flags ON and NO_RC_RELATED_CONSTRAINT.

NO_RC_RELATED_CONSTRAINT is set to true if the CellId group is outband. For the inband CellId group, it is set to true if either there is no RC-constraint or the response regarding the originating carrier has already been received and processed.

Now, it is required to determine efficiently the two aforementioned criteria—i) All_BTSes_of this_CellID-X_group_responded or equivalently, all carriers of a CellId group have been considered and ii) HIGHER_PRIORITY_CARRIER_SELECTION, that is, if all carriers of a CellId group with preference value equal to or higher than the current best of that CellId group have been considered. In a preferred embodiment, the information about different 1-1 overlay systems or CellIds is stored as an array whose entries (the rows of the table in FIG. 3) can be indexed using CellId values. Each row containing the information about constituent BTSes is arranged as an ordered (linked) list of BTSes arranged in the descending order of their respective highest preference (for call set-up) carriers. Carrier information within each BTS-information is arranged as an embedded linked list. As and when a response from a BTS is received, the information about its carriers is processed for determination of the best carrier in the corresponding CellId group, and the information about that BTS is removed for the linked list. Removing processed entries from the list permits faster subsequent list traversals and thereby contributes to the overall efficiency of the process. Additionally, the determination if all BTSes have responded (first condition above) is performed by checking if the list is empty. Moreover, determination of the second condition is efficient with this approach because when the currently responded/processed BTS is at the head of the list and the next BTS in the list has preference value (that is, preference value of its best carrier) less than that of the current best carrier, it can be inferred that all carriers of this CellId group with preference value equal to or higher than the current best have been considered.

Figure 4A:
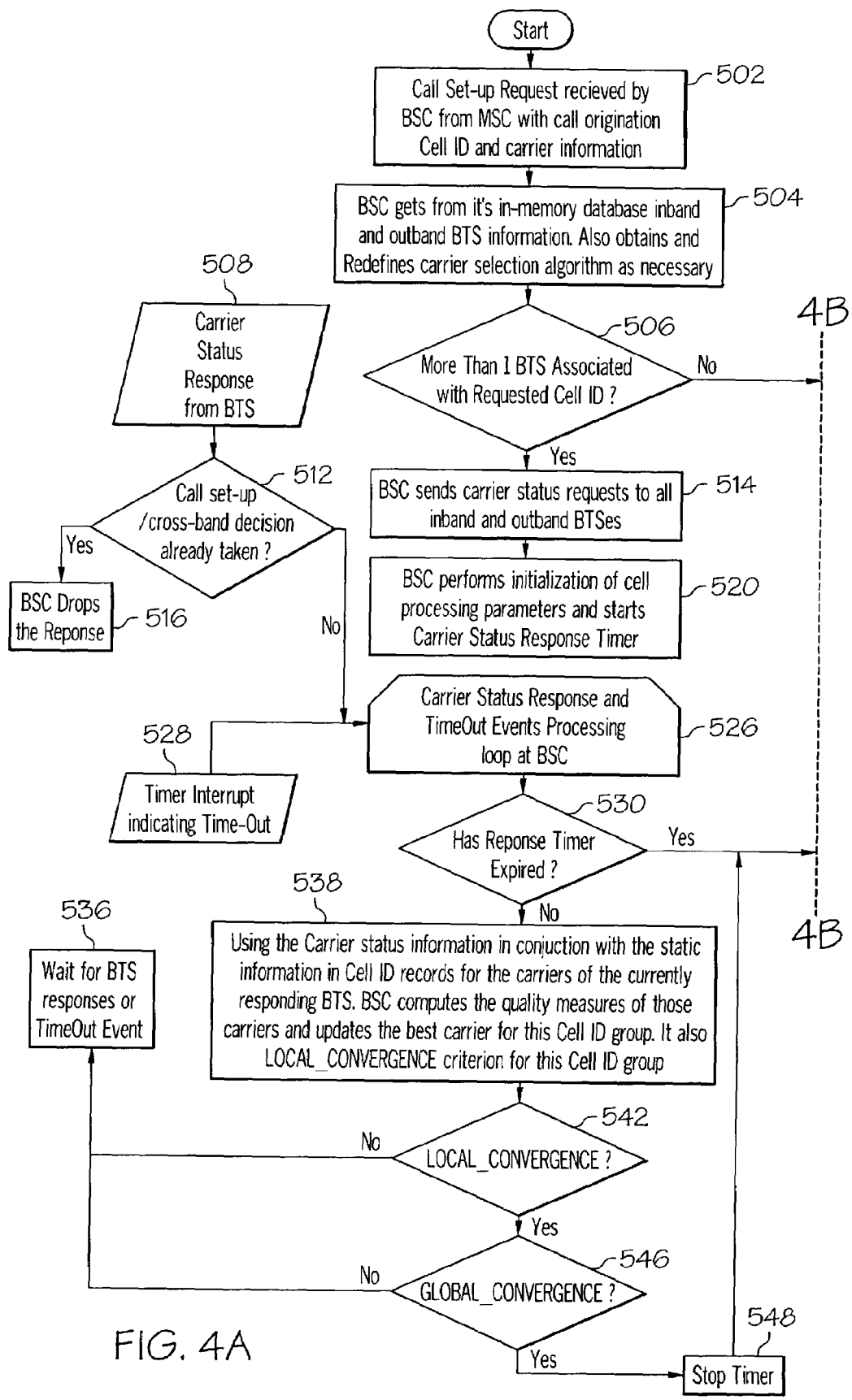
FIG. 4 is a logic flow diagram illustrating one possible sequence of operations involved in the selection of the best carrier in the band of call origination for call set-up and redirection of the call to the non-originating band.
Figure 4B:
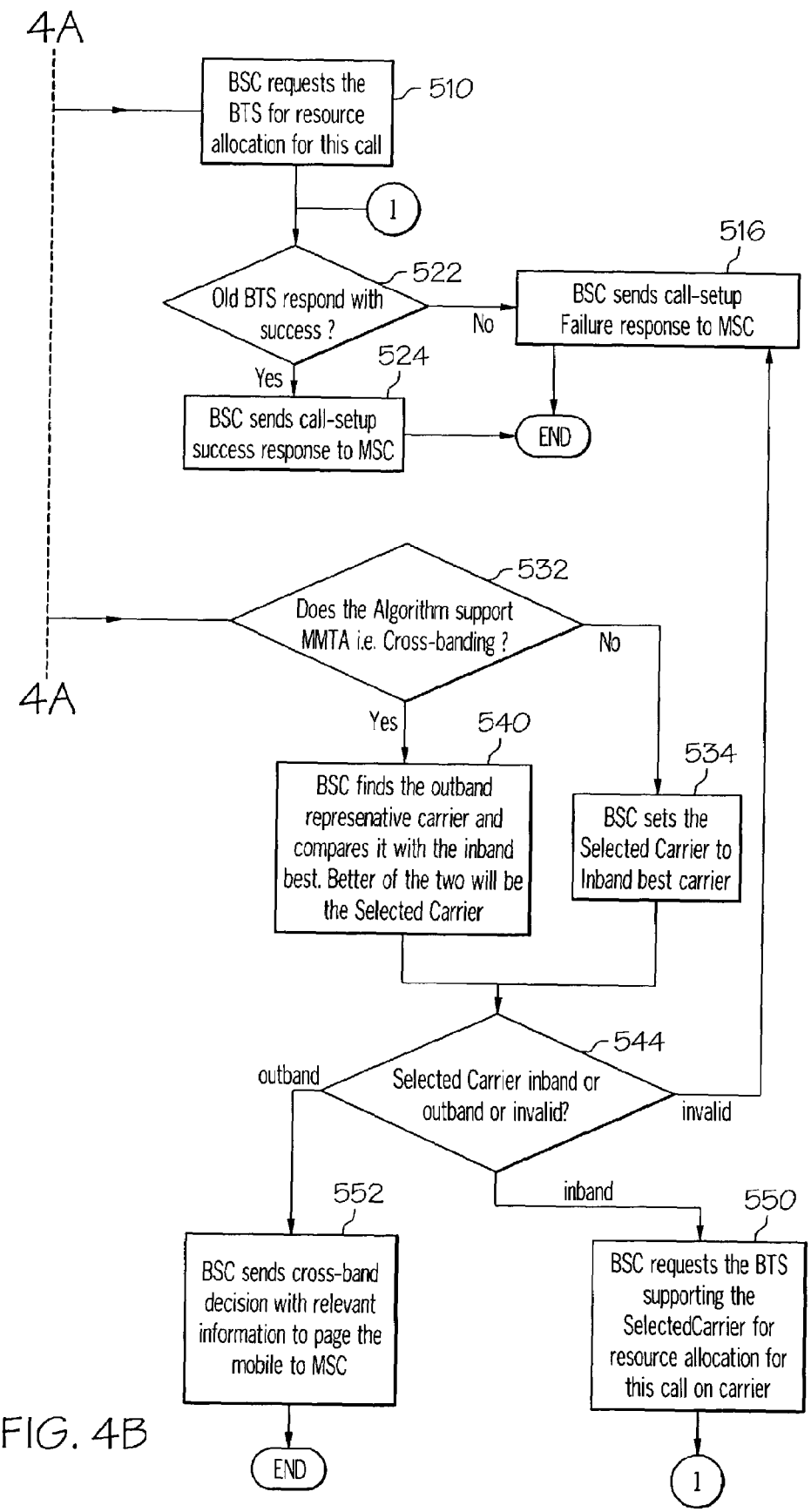

With reference now to FIG. 4, one possible logical flow of operations involved in call setup or redirection by carrier selection using the above-mentioned elemental contributions of this invention is depicted. The overall process of determining the ideal carrier for call setup is triggered at Base Station Controller (BSC) when it receives a call setup request from Mobile Switching Center (MSC) with information about the originating CellId (1-1 overlay system) and carrier as illustrated at step 502. BSC retrieves from its in-memory database the corresponding CellId record containing pre-configured information about different BTSes (shortly denoted as BTSINFO) in the overlay system as depicted at step 504. BTSINFO, in turn, contains the communication address of the BTS and the information about its carriers (shortly denoted as CARRIERINFO). CARRIERINFO contains the algorithm associated with a carrier, carrier identity, its preference value, threshold (capacity reserved for soft-handoff calls and other purposes) and cell-capability (ability to support 2G/3G voice calls and/or data calls). If the cell capability (say, 2G voice) does not support the radio configuration for a call (say, 3G voice), the carrier is said to be downgraded and accordingly ND-bit of the carrier quality measure will be set to zero for this carrier. This downgraded information usually comes from Base Trans-Receiver (BTS) and, in situations when it does not come, BSC computes it this way. Carrier algorithm identifier indicates whether Multimode Traffic Allocation (MMTA), i.e. cross-banding or call allocation across bands is permitted for this call and either or both of the RC and RB constraints are to be applied for carrier selection in this call set-up process.

As shown in the table of FIG. 3, the CellId record also contains a resource list or list of CellIds corresponding to the multiple outband overlay systems. In case this list is empty, there is no way of obtaining the information required to redirect the call to the other band even if algorithm associated with the originating carrier specifies MMTA-requirement. Hence, in this case the algorithm is redefined in step 504 to an algorithm without MMTA capability. RB-constraint, if present in the original algorithm, becomes irrelevant and RC-constraint is left intact in the redefined algorithm. Now, as per the revised algorithm, the call must be established on the best inband carrier only.

Next, as illustrated at step 506, the inband BTSINFO list (that is, the list associated with the originating CellId and outband BTSINFO lists (the lists associated with the CellIds in the resource list, if it is not empty) are examined to determine if more than 1 BTS is associated with this call setup request. If only one BTS is available for call set up and that happens to be an inband BTS, control passes to step 510 since BSC can now delegate to that BTS the task of determining the best carrier for call setup. As depicted at step 510, BSC requests the BTS resource allocation for the current call. If the BTS responds with success (determined at step 522), BSC sends a call-setup success response to the MSC as illustrated at step 524. Otherwise, the BSC sends a call-setup failure response to the MSC as depicted at step 516.

In the alternative case, where more than 1 BTS is associated with the originating CellId, the BSC transmits a request to all inband and outband BTSes (if resource list is not empty) to pass on the information regarding the capacities and downgraded statuses of their respective carriers as depicted at step 514. Afterwards the BSC performs initialization of call processing parameters. The first step of this initialization process is to activate the capacity response timer as illustrated at step 520. The capacity response timer is utilized to allow processing to proceed if a timely response is not received from a BTS. In the event of a timeout, an interrupt is fired as depicted at step 528.

In the situation where multiple BTSes need to be considered for the present call, the initialization depicted at step 520 further comprises the BSC initializing LOCAL_CONVERGENCE flags for individual CellIds to true and the corresponding best carrier states to invalid. Only when the capacity request is sent to the first BTS of CellId group, the corresponding LOCAL_CONVERGENCE flag is set to false so that flagging of convergence is not delayed waiting for responses from BTSes for which requests were never sent. Again, only when a BTS responds with a carrier with non-zero capacity, the corresponding CellId best carrier status is set to valid.

As and when a capacity response arrives from a BTS as depicted at step 508, BSC first checks (by examining the existence of the transaction with an ID associated with this call setup) whether a decision regarding the call has already been taken as illustrated at step 512. If so, the response is dropped by the BSC as depicted at step 518. Otherwise, the process enters the capacity response loop at the BSC as depicted at step 526.

Provided the response timer has not expired (determined at step 530), the BSC processes a BTS capacity response that arrives. The BSC computes the quality measures for the carriers of that BTS (or a selected carrier of the BTS, if BTS has its own selection) and updates the corresponding CellId best carrier as illustrated at step 538. Afterwards, the BSC checks for local convergence by computing the boolean value of LOCAL_CONVERGENCE as illustrated at step 542. If it is false, the BSC waits for further capacity response as depicted at step 536. Otherwise, the BSC computes GLOBAL_CONVERGENCE as depicted at step 546. If GLOBAL_CONVERGENCE is false, the BSC will wait for further capacity responses as illustrated at step 536. Otherwise, the BSC stops the capacity response timer as depicted at step 548 and enters the final stage of the carrier determination process (staring with step 532). The final stage of processing is also entered in the event of a time out determined at step 530.

In the final stage of carrier determination, BSC checks whether the algorithm and other constraints such as mobile capability and empty/non-empty resource list, permit call setup across bands as illustrated at step 532. If MMTA (cross-banding) is permitted, the BSC selects the better of the inband best and outband representative carrier as the selected carrier as depicted at step 540. Otherwise, the inband best carrier becomes the selected carrier as illustrated at step 534. The selected carrier may be invalid in the situation where no response with non-zero capacity carrier arrived before timeout. A determination is made as to whether the selected carrier is inband, outband, or invalid as depicted at step 544. If the carrier is invalid, the BSC indicates call setup failure to MSC as illustrated at step 516.

If the selected carrier is outband, BSC de-allocates its resources to the current call and sends to MSC its decision to redirect the call to the other band with some relevant information such as list of PN-codes (required by mobile for decoding messages from the BTS) depicted at step 552. Using this information, MSC will page the mobile and request it to re-originate the call to the non-originating band. The mobile will re-originate the call in a way transparent to the user and the call will be set up using the same carrier determination process with the other band as the originating band. In order to avoid ping-pong effect of repeated call redirections due to tilts in the capacities of the carriers in the two bands during the time window of call processing, MMTA is precluded at BSC in re-originated calls by the earlier discussed algorithm re-definition process at step 504.

Finally, in a situation where the selected carrier happens to be the inband carrier, BSC requests corresponding BTS for resources for call setup on this carrier as illustrated at step 550, and depending upon the latter's response, call setup success or failure is intimated to MSC. In success scenarios, the call will be eventually set up on the selected carrier.

Those skilled in the art will readily appreciate that the principles of this invention, including the carrier quality measure or other methods of carrier-to-carrier comparison, best carrier search convergence criteria, and the method of selecting the non-originating band carrier for the purpose of making decisions about redirection of the call to the non-originating band are applicable to wireless data and voice communication systems operating according to the TIA/EIA/IS95 Code Division Multiple Access (CDMA) standard, or subsequent version thereof, or the TIA/EIA/IS2000 CDMA standard. Further, one of ordinary skill in the art will appreciate that the principles also apply to other wireless data and voice communication systems operating according to other standards such as 1XEV standard, as well, in which multiple carrier frequencies overlay one another to increase the capacity of the corresponding wireless communication systems. Even further, the principles are partly applicable (excepting the method of selection of the outband representative) to WCDMA systems based on the UMTS standards and will be applicable fully to those systems when one or more bands are added to the existing 2 GHZ band for access.

An enhanced embodiment of this invention will be applicable to next generation wireless systems that will operate in more than to bands. The embodiment handles the case of multiple non-originating bands with their respective non-1-1-overlay systems (that is, respective multiple spatially disjoint 1-1 overlay systems covering the range of the 1-1-overlay system of the originating band). Here the CellId table needs to be having multiple resource lists one for each non-originating band. The logical flow of operation involved in this enhanced embodiment will be exactly the same till step 540 in which representative carrier from non-originating band carrier will be selected. This step needs to be modified as follows in the enhanced embodiment:

If inband best carrier has capacity, obtain the min-max representative from each one of the multiple non-originating bands. The non-originating band with the best representative will be the selected non-originating band. Now, compare the inband best carrier with the representative of the selected non-originating band.

If the inband carrier is better, go to step 550;

Otherwise, go to step 552. Mobile here is required to select the selected non-originating band from a list of bands for call re-origination.

If neither inband best carrier nor the min-max carrier of the selected non-originating band have capacity, obtain max-max representatives for all the non-originating bands. The reselected non-originating band will be the one with the best representative. Now, If the max-max representative carrier of the reselected band does not have capacity, fail the call by going to step 516.

Otherwise, go to step 552. Mobile here is required to select the reselected non-originating band from a list of bands for call re-origination.

The present invention has been described in relation to particular embodiments, which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing discussion.

What is claimed is:

1. A method of call processing for a mobile station that is able to operate in plural bands in a wireless network having an inband base station tranceiver (BTS) operating on an inband carrier, and one or more outband BTSes operating on respective one or more outband carriers, the method of comprising:

comparing a quality measure of the inband carrier to a quality measure of a representative outband carrier of the one or more outband carriers;

determining, based on comparing the quality measures, whether the representative outband carrier is better than the inband carrier;

in response to determining that the representative outband carrier is better than the inband carrier, initiating a migration of the mobile station from the inband carrier to one of the one or more outband carriers; and determining the quality measures for the inband and outband carriers, wherein each quality measure includes a corresponding data word comprising:

a non-downgraded bit;

a spare capacity bit; and a retain carrier bit.

2. A method for a mobile device to migrate transmission bands from an inband carrier to an outband carrier, said method comprising:

determining quality of measure criteria for comparison of said inband carrier and said outband carrier, determining if said outband carrier is available for use by said mobile device;

in response to determining said outband carrier is available, comparing said inband carrier with said outband carrier utilizing said quality of measure criteria; and in response to said outband carrier being better than said inband carrier, migrating said mobile device transmission from said inband carrier to said outband carrier.

3. A method of call processing for a mobile station that is able to operate in plural bands in a wireless network having an inband bas station transceiver (BTS) operating on an inband carrier, and plural outband BTSes operating on respective plural outband carriers, the method comprising:

comparing a quality measure of the inband carrier to a quality measure of a representative outband carrier of the outband carriers;

determining based on comparing the quality measures, whether the representative outband carrier is better than the inband carrier;

in response to determining that the representative outband carrier is better than the inband carrier, initiating a migration of the mobile station from the inband carrier to one of the outband carriers; and selecting a worst of the plural outband carriers as the representative outband carrier, wherein the selecting is based on comparing quality measures of the plural outband carriers.

4. The method of claim 3, further comprising:
in response to determining that the inband carrier is better than the representative outband carrier, establishing the call on the inband carrier.

5. The method of claim 3, wherein the plural outband BTSes are part of multiple outband BTS sites, the method further comprising:
for each of the multiple outband BTS sites, determining a best outband carrier from outband carriers used in the respective outband BTS site, wherein the determining is based on quality measures of the outband carriers in each outband ETS site; and
using the determined best outband carriers of the corresponding outband BTS sites as the plural outband carriers from which the worst of the plural outband carriers is selected as the representative outband carrier.

6. The method of claim 5, wherein determining the best outband carrier for each of the outband BTS sites based on the quality measures comprises:
obtaining a list of outband BTS sites from a table having a resource list associated with said inband carrier;
transmitting a status request message to each outband BTS at each outband BTS site in said list of outband BTS sites; and
waiting for a status reply message from each outband BTS.

7. The method of claim 6, wherein determining the best outband carrier for each of the outband BTS sites based on the quality measures further comprises:
starting a timer in response to transmitting said status request message;
in response to receiving said status reply message prior to said timer expiring, processing said status reply message; and
in response to receiving said status reply message after said timer expires, discarding said status reply message.

8. The method of claim 5, wherein determining the best outband carrier for each of the outband BTS sites based on the quality measures comprises:
terminating search for said best outband carrier in response to convergence criteria.

9. The method of claim 8, wherein said convergence criteria comprises:
a local convergence criteria; and
a global convergence criteria.

10. The method of claim 3, wherein the inband carrier is a selected one of plural inband carriers, the method further comprising:
selecting a best inband carrier from the plural inband carriers as the selected one inband carrier, wherein the selecting is based on quality measures of the inband carriers.

11. The method of claim 10, wherein comparing the quality measure of the inband carrier to the quality measure of the representative outband carrier comprises comparing the quality measure of the best inband carrier to the quality measure of the worst outband carrier.

12. The method of claim 10, wherein the call processing is performed in response to call origination of the mobile station on one of the inband carriers.

13. A method of call processing for a mobile station that is able to operate in plural bands in a wireless network having an inband base station transceiver (BTS) operating on an inband carrier, and one or more outband BTSes operating on respective one or more outband carriers, the method comprising:
comparing a quality measure of the inband carrier to a quality measure of a representative outband carrier of the one or more outband carriers;
determining, based on comparing the quality measures, whether the representative outband carrier is better than the inband carrier;
in response to determining that the representative outband carrier is better than the inband carrier, initiating a migration of the mobile station from the inband carrier to one of the one or more outband carriers;
in response to detecting the inband carrier having capacity, selecting the representative outband carrier as a worst of plural outband carriers based on corresponding quality measures; and
in response to detecting the inband carrier not having capacity, selecting the representative outband carrier as a best of the plural outband carriers based on corresponding quality measures.

14. A base station controller (BSC) to perform call processing for a mobile station that is able to operate in plural bands including an origination band and a non-origination band in a wireless network, the BSC comprising:
a storage to store a database containing information regarding base transceiver systems (BTSes); and
a processor to:
in response to a call request associated with the mobile station, access the database to identify BTSes involved in the call request, wherein the identified BTSes include an origination band BTS operating on an origination band carrier, and a non-origination band BTS operating on a non-origination band carrier;
compute quality measures for the origination and non-origination band carriers, wherein each quality measure comprises a non-downgraded status indicator and an available capacity indicator;
compare the quality measures to determine whether the non-origination band carrier is better than the origination band carrier; and
in response to determining that the non-origination band carrier is better than the origination band carrier, initiate migration of the mobile station from the origination band carrier to the non-origination band carrier.

15. The BSC of claim 14, wherein the processor is configured to:
in response to determining that the origination band carrier is better than the non-origination band carrier, establish the call on the origination band carrier.

16. A base station controller (BSC) to perform call processing for a mobile station that is able to operate in plural bands including an origination band and a non-origination band in a wireless network, the BSC comprising:
a storage to store a database containing information regarding base transceiver systems (BTSes); and
a processor to:
in response to a call request associated with the mobile station, access the database to identify BTSes involved in the call request, wherein the identified BTSes include an origination band BTS operating on an origination band carrier, and a non-origination band BTS operating on a non-origination band carrier;
compute quality measures for the origination and non-origination band carriers;

compare the quality measures to determine whether the non-origination band carrier is better than the origination band carrier; and in response to determining that the non-origination band carrier is better than the origination band carrier, initiate migration of the mobile station from the origination band carriers, to the non-origination band carrier, wherein the wireless network comprises plural non-origination band BTSes operating on corresponding plural non-origination band carriers, wherein the processor is configured to further:

select a worst of the plural non-origination band carriers to compare with the origination band carrier, wherein the selecting is based on comparing quality measures of the plural non-origination band carriers.

17. The BSC of claim 16, wherein the plural non-origination band BTSes are part of multiple non-origination band BTS sites, and wherein the processor is configured to further:

for each of the multiple non-origination band BTS sites, determine a best non-origination band carrier from non-origination band carriers used in the respective non-origination band BTS site, wherein the determining is based on quality measures of the non-origination band carriers in each non-origination band BTS site; and use the determined best non-origination band carriers of the corresponding non-origination band BTS sites as the plural non-origination band carriers from which the worst of the plural non-origination band carriers is selected for comparing to the origination band carrier.

18. The BSC of claim 17, wherein the origination band carrier is a selected one of plural origination band carriers, and the processor is configured to further:

select a best origination band carrier from the plural origination band carriers as the selected one origination band carrier, wherein the selecting is based on quality measures of the origination band carriers.

* * * * *